(12) United States Patent
Klein

(10) Patent No.: US 9,144,103 B2
(45) Date of Patent: Sep. 22, 2015

(54) WIRELESS LOCAL COMMUNICATION SYSTEMS AND METHODS FROM WAN FALLBACK

(71) Applicant: MOTOROLA SOLUTIONS, INC., Schaumburg, IL (US)

(72) Inventor: David E. Klein, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 213 days.

(21) Appl. No.: 13/873,649

(22) Filed: Apr. 30, 2013

(65) Prior Publication Data

US 2014/0321444 A1    Oct. 30, 2014

(51) Int. Cl.
| | | |
|---|---|---|
| H04W 76/04 | (2009.01) | |
| H04W 8/26 | (2009.01) | |
| H04W 76/00 | (2009.01) | |
| H04W 4/10 | (2009.01) | |

(52) U.S. Cl.
CPC .......... *H04W 76/045* (2013.01); *H04W 76/043* (2013.01); *H04W 4/10* (2013.01); *H04W 8/26* (2013.01); *H04W 76/007* (2013.01)

(58) Field of Classification Search
None
See application file for complete search history.

(56) References Cited

U.S. PATENT DOCUMENTS

| | | | |
|---|---|---|---|
| 7,116,645 B2 | 10/2006 | Morvan et al. | |
| 7,769,378 B2 | 8/2010 | Dorenbosch et al. | |
| 7,792,935 B2 | 9/2010 | Karjanlahti | |
| 8,254,877 B2 | 8/2012 | Edge et al. | |
| 8,326,372 B2 | 12/2012 | Raissinia | |
| 8,391,918 B2 | 3/2013 | Ekici et al. | |
| 2004/0023652 A1 | 2/2004 | Shah et al. | |
| 2004/0184422 A1 | 9/2004 | Shaheen et al. | |
| 2004/0240403 A1* | 12/2004 | Kotzin | 370/310 |
| 2005/0078624 A1 | 4/2005 | Shu et al. | |
| 2005/0135236 A1 | 6/2005 | Benson et al. | |

(Continued)

FOREIGN PATENT DOCUMENTS

| | | |
|---|---|---|
| CA | 2398185 C | 1/2013 |
| WO | 2007044594 A2 | 4/2007 |

OTHER PUBLICATIONS http://mutualink.net/PDF/Smartphone-Commander-7-15-10.pdf 1 page; 2010.

(Continued)

*Primary Examiner* — Awet Haile
(74) *Attorney, Agent, or Firm* — Steven A. May; Kenneth Haas

(57) ABSTRACT

A method, a mobile device, and a wireless system provide wireless local communication systems and methods from Wide Area Network (WAN) fallback allowing proximate users to maintain connectivity therebetween while WAN connectivity is lost. The wireless local communication systems and methods leverage access point credentials for the WAN to set up local wireless communication amongst the mobile devices when WAN connectivity is lost or when commanded to do so. Local mobile device users can maintain communication such as in a talkgroup while WAN connectivity is disrupted or undesired. The systems and methods include an algorithm where a first mobile device identifies the loss of WAN connectivity and becomes a WAN access point for other proximate mobile devices which share common preconfigured credentials. Subsequent mobile devices which detect the loss of WAN connectivity can associate with the AP thereby maintaining local communication using local wireless connectivity techniques.

16 Claims, 6 Drawing Sheets

(56) References Cited

U.S. PATENT DOCUMENTS

| | | |
|---|---|---|
| 2009/0291704 A1 | 11/2009 | Korus et al. |
| 2010/0246502 A1* | 9/2010 | Gong et al. ............... 370/329 |
| 2011/0145421 A1 | 6/2011 | Yao et al. |
| 2012/0195193 A1 | 8/2012 | Camps Mur et al. |
| 2012/0320886 A1* | 12/2012 | Anders et al. ............ 370/338 |
| 2013/0182614 A1* | 7/2013 | Kumar et al. ............. 370/255 |

OTHER PUBLICATIONS

PCT International Search Report Dated October 13, 2014 Counterpart to PCT/US2014/031747.

* cited by examiner

US 9,144,103 B2

WIRELESS LOCAL COMMUNICATION SYSTEMS AND METHODS FROM WAN FALLBACK

BACKGROUND OF THE INVENTION

Wireless communication systems and methods are ubiquitous. In general, mobile devices, such as user equipment (UEs), radios, smart phones, tablets, etc. (collectively "mobile devices") are configured to operate on wireless networks which can include wireless local area networks (WLANs) and wide area networks (WANs). Wireless networks have defined wireless coverage, and mobile devices outside of such wireless coverage cannot communicate. For example, WLAN connectivity is generally localized whereas WAN connectivity is broader geographically but can include dead zones. In the context of on-scene communications, various users with mobile devices can be at a location and communicating therebetween such as in a talkgroup or the like through a WAN. If there is loss of connectivity to the WAN, on-scene communications is lost between the users. This can be problematic especially in the context of public safety users or the like during on-scene communications.

Accordingly, there is a need for a method and apparatus for wireless local communication systems and methods from WAN fallback allowing users to maintain connectivity therebetween while WAN connectivity is lost or undesired.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
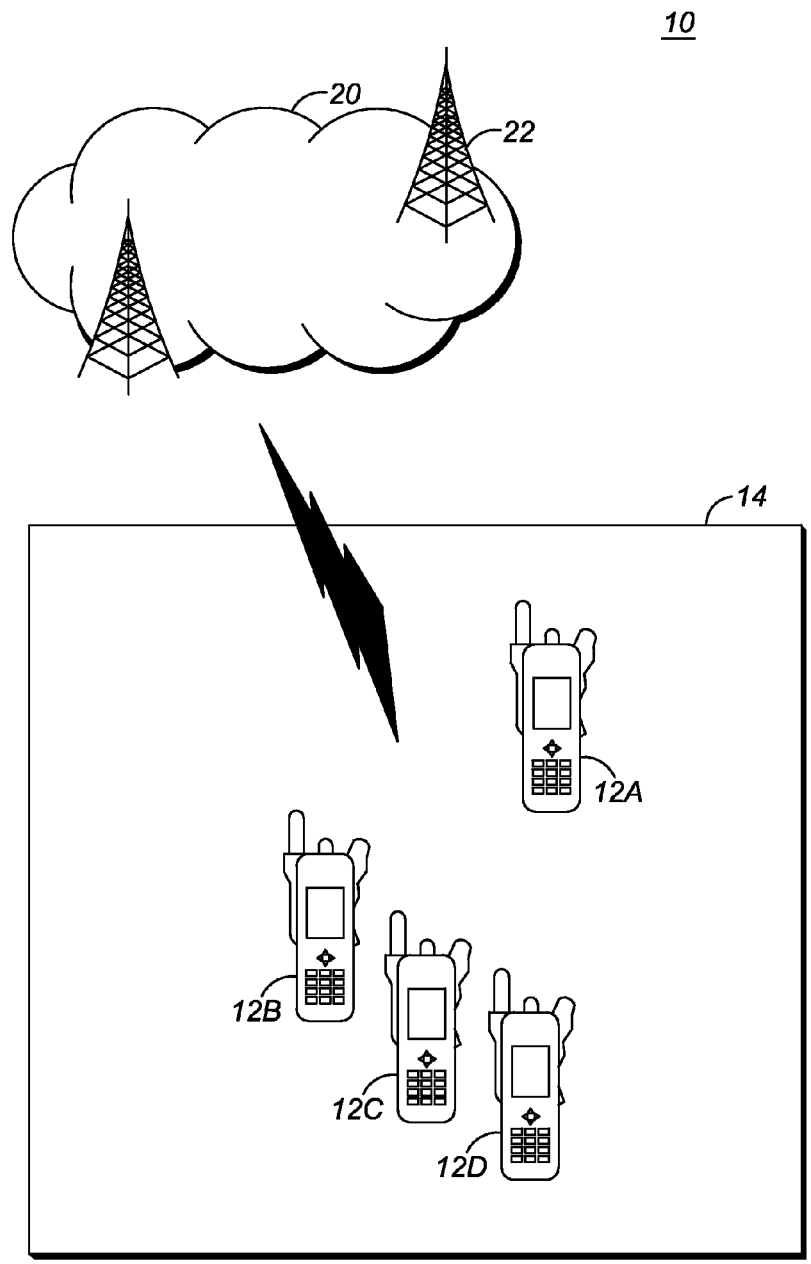
FIG. 1 is a network diagram of a mobile device communication system with WAN connectivity in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method includes performing, by a mobile device, one of determining that communication with a wide area network (WAN) access point is unsuccessful or receiving an explicit command; and taking a role of the WAN access point by the mobile device when the communication is unsuccessful or based on the explicit command; wherein the mobile device uses access point credentials that are based on at least a group identifier used with the WAN access point.

In another exemplary embodiment, a mobile device includes a wireless network interface configured to communicate in a wide area network (WAN) and in a local area network; a processor communicatively coupled to the wireless network interface; and memory storing instructions that, when executed, cause the processor to: perform one of determining that communication with a wide area network (WAN) access point is unsuccessful or receiving an explicit command; and take a role of the WAN access point when the communication is unsuccessful or based on the explicit command; wherein the mobile device uses access point credentials that are based on at least a group identifier used with the WAN access point.

In yet another exemplary embodiment, a wireless system includes a plurality of mobile devices configured to communicate in a wide area network and in a local area network at a location, wherein the plurality of mobile devices are associated to one another via one or more identifiers prior to arrival at the location; memory in each of the plurality of mobile devices storing instructions that, when executed, cause each of the plurality of mobile devices to: perform one of determining that communication with a wide area network (WAN) access point is unsuccessful or receiving an explicit command; and take a role of the WAN access point when the communication is unsuccessful or based on the explicit command; wherein the mobile device uses access point credentials that are based on at least a group identifier used with the WAN access point.

In various exemplary embodiments, the present disclosure relates to wireless local communication systems and methods from WAN fallback allowing proximate users to maintain connectivity therebetween while WAN connectivity is lost or undesired. The wireless local communication systems and methods leverage access point credentials for the WAN on mobile devices to set up local wireless communication amongst the mobile devices when WAN connectivity is lost or undesired. In this manner, local mobile device users can maintain communication such as in a talkgroup while WAN connectivity is disrupted or undesired. The present disclosure leverages local wireless technologies such as, without limitation, Wi-Fi, WLAN, IEEE 802.11 and variants thereof, Bluetooth, etc., which are ubiquitous in modern mobile devices as well as access point credentials for the WAN that identify the specific mobile device, specific individual user, talkgroups or other group associations, associated peers, WAN system references, Access Point Name reference for associated packet data networks, etc.

The systems and methods include an algorithm in which a first mobile device identifies the loss of WAN connectivity and becomes a local access point (AP) for other proximate mobile devices which share WAN access point credentials. Subsequent mobile devices which detect the loss of WAN connectivity can associate with the first mobile device thereby maintaining local communication using local wireless connectivity techniques. Variously, overall flow of the systems and methods utilize preconfigured authentication to a secondary network when the primary network fails or if the units are pushed to the secondary network. That is, the systems and methods use WAN access point credentials which allow the mobile devices to communicate to one another over the WAN to quickly establish a local wireless network therebetween without requiring setup between the mobile devices. In this manner, pre-known common WAN access point credentials are used to set up a WLAN network thereby avoiding setup messages and configuration.

Figure 2:
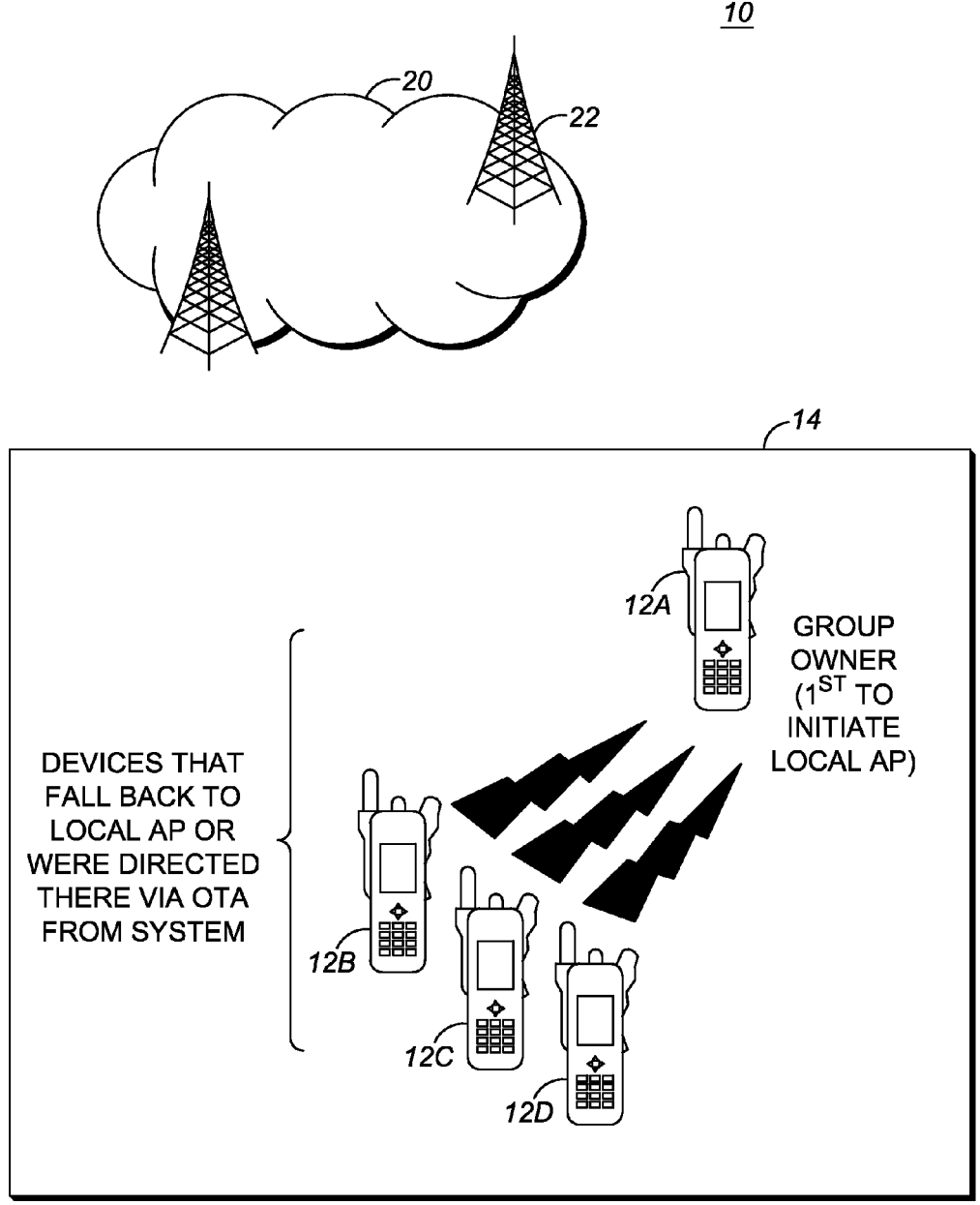
FIG. 2 is a network diagram of the mobile device communication system of FIG. 2 without WAN connectivity and with wireless local communication systems and methods from WAN fallback in accordance with some embodiments.
Figure 3:
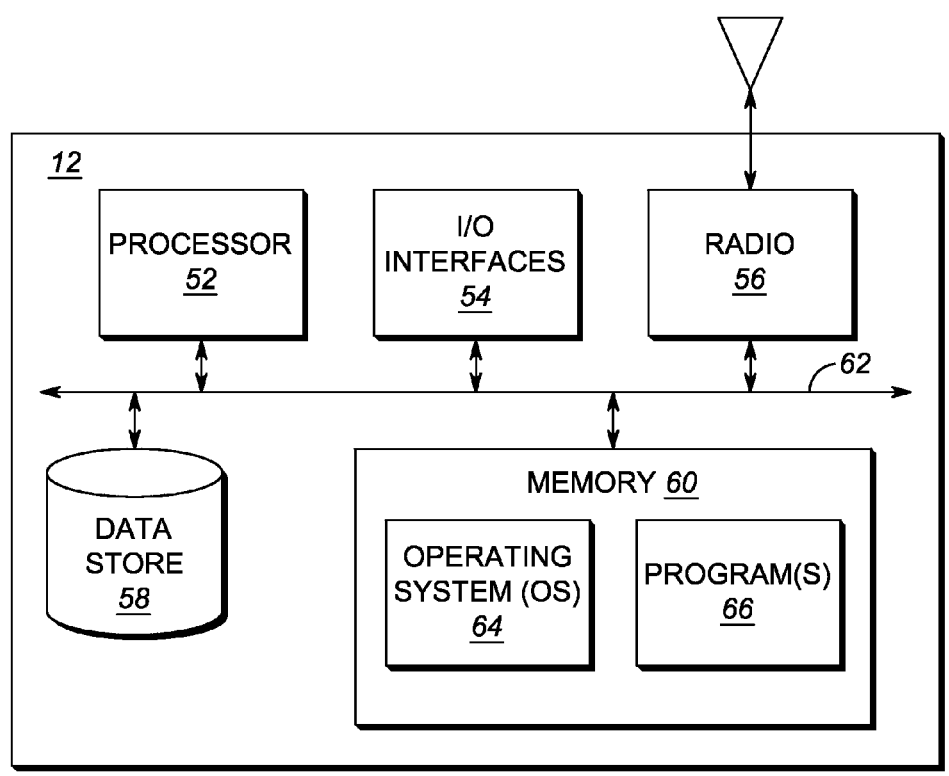
FIG. 3 is a block diagram of a mobile device in accordance with some embodiments.

Referring to FIGS. 1 and 2, in an exemplary embodiment, a network diagram illustrates a mobile device communication system 10. In FIG. 1, the mobile device communication system 10 includes mobile devices 12A, 12B, 12C, 12D located proximate to one another at a location 14. The mobile devices 12A, 12B, 12C, 12D can be a mobile device such as depicted in FIG. 3. In FIG. 1, the mobile devices 12A, 12B, 12C, 12D are configured to communicate wirelessly with a wide area network (WAN) 20. For example, the location 14 can be an on-scene location or incident and the mobile devices 12A, 12B, 12C, 12D can be associated with public safety personnel or the like and part of a talkgroup, system, or the like therebetween. The WAN 20 can include, without limitation, a Land Mobile Radio (LMR) system, a 3G system and variants thereof, a 4G system and variants thereof, a Long Term Evolution (LTE) system and variants thereof, a Global System for Mobile Communications (GSM) system and variants thereof, General packet radio service (GPRS) system and variants thereof, Terrestrial Trunked Radio (TETRA) system and variants thereof, or the like.

The WAN 20 can include one or more WAN access points 22 which are network devices providing wireless connectivity to the mobile devices 12A, 12B, 12C, 12D. For example, the WAN access points 22 can be referred to as base stations, cell towers, cell sites, evolved node B, etc. Note, the WAN 20 can include other network devices which are omitted for illustration purposes. Those of ordinary skill in the art will recognize that there can be various components in the WAN 20 including the WAN access points 22 that enable communications between the mobile devices 12A, 12B, 12C, 12D over the WAN 20. For example, this can include talkgroup servers or the like or other components. Each of the mobile devices 12A, 12B, 12C, 12D is preconfigured with WAN access point 22 credentials that, among other things, allow these devices to communicate on the WAN 20, participate in communications with other devices, and the like. In the context of the systems and methods described herein, the mobile device 12A, 12B, 12C, 12D uses access point credentials that are based on at least a group identifier used with the WAN access point to quickly and efficiently set up a local wireless network when WAN 20 connectivity is lost or undesired.

Of note, the WAN 20, in the context of public safety and the like, is transitioning from an LMR system to cellular broadband solutions (e.g., 3G, 4G, etc.). The WAN 20 is used for backhaul to an end system for the various mobile devices 12A, 12B, 12C, 12D to communicate therebetween at the location 14 such as, for example, via push-to-talk (PTT) or the like. As such, the mobile devices 12A, 12B, 12C, 12D include the WAN access point 22 credentials such as system ID, talkgroup ID, individual ID, network address, device address, username/password, and the like that enables them to communicate therebetween at the location 14. As described herein, the WAN access point 22 credentials can include anything associated with the mobile devices 12A, 12B, 12C, 12D that enables the associated users to communicate and/or associated therebetween at the location 14. That is, the mobile devices 12A, 12B, 12C, 12D have prior knowledge of the WAN access point 22 credentials before their associated users are at the location 14, such as in a Universal Subscriber Identity Module (USIM). This can be through a setup or configuration of the mobile devices 12A, 12B, 12C, 12D prior to deployment in the field such as to the location 14.

FIG. 2 is a network diagram of the mobile device communication system 10 with connectivity lost by the mobile devices 12A, 12B, 12C, 12D to the WAN 20. For example, the connectivity loss can be for a variety of reasons such as no WAN coverage at the location 14, spotty WAN coverage at the location 14, physical obstructions causing coverage problems, and the like. As in FIG. 1, the users of the mobile devices 12A, 12B, 12C, 12D are at the location 14 in FIG. 2, but unable to communicate due to the loss of connectivity to the WAN 20. In FIG. 1, the WAN 20 is providing backhaul to the end system for communication between the mobile devices 12A, 12B, 12C, 12D. In FIG. 2, with the loss of communication to the WAN 20, the mobile devices 12A, 12B, 12C, 12D are initially unable to communicate therebetween. Alternatively to loss or poor WAN coverage, the systems and methods can operate based on an explicit command to switch to a local mode.

In various exemplary embodiments, the wireless local communication systems and methods from WAN fallback enable communication between the mobile devices 12A, 12B, 12C, 12D and other proximate mobile devices sharing common preconfigured credentials despite loss of connectivity on the WAN 20. As described herein, the WAN 20 can be a cellular broadband technology such as LTE, and public safety operators are transitioning from LMR to the cellular broadband technologies. The systems and methods described herein provide a mechanism for on-scene communications amongst the mobile devices 12A, 12B, 12C, 12D in the absence of connectivity to the WAN 20. In an exemplary aspect, Wi-Fi Voice over Internet Protocol (VoIP) can be used as an exemplary application between the mobile devices 12A, 12B, 12C, 12D, and it is an objective of the systems and methods described herein to address the association of users of the mobile devices 12A, 12B, 12C, 12D like in conventional LMR.

As described herein, the mobile devices 12A, 12B, 12C, 12D are configured for at least dual modes of connectivity, i.e. to the WAN 20 and a mode of local wireless connectivity. As described herein, the mode of local wireless connectivity can include, without limitation, Wi-Fi, WLAN, IEEE 802.11 and variants thereof, Bluetooth (BT), and the like. The WAN 20 connectivity is a longer range connectivity whereas the mode of local wireless connectivity has a limited geographical range. Thus, when the WAN 20 connectivity is lost or undesired, the mobile devices 12A, 12B, 12C, 12D can still communicate locally to one another via the mode of local wireless connectivity. In an exemplary embodiment, the systems and methods can utilize Unlicensed Mobile Access (UMA) with some knowledge of network communication (i.e., the preconfigured WAN access point 22 credentials) for fallback from the WAN 20 to Wi-Fi/BT when the cellular signal is lost. Standard 802.11z Tunneled Direct Link Setup (TDLS), Wi-Fi Alliance Wi-Fi Direct, and TETRA Direct Mode Operation (DMO) mode all deal with direct device to device operation to ease AP/Network elements with timing frames still supplied by AP/Network. Pure 802.11 Independent Basic Service Set (IBSS) ad-hoc mode operation is simply a beacon discovery method where devices are able to supply SSI and timing frames. These methods do not inherently support any logical group communications as would be required for the mobile devices 12A, 12B, 12C, 12D in the mode of local wireless connectivity.

The systems and methods manage linking the mobile devices 12A, 12B, 12C, 12D together when they are dispatched to the location 14 and the WAN 20 is not available or not desirable. The systems and methods can use the building blocks of ad-hoc 802.11 (Wi-Fi Direct), 802.11z (TDLS), along with the definition of the LTE SIM technology and Wi-Fi Multicasting technology, MESH, etc. In FIG. 2, when users of the mobile devices 12A, 12B, 12C, 12D are dispatched to the location 14, and connectivity to the WAN 20 is lost or undesirable, a first mobile device 12A which detects this condition can become an incident command AP (with TDLS and multi-casting) and accountability software to perform conventional call set up with Wi-Fi/LTE set up. This is performed per talkgroup, i.e. the mobile device 12A and the mobile devices 12B, 12C, 12D are in a common talkgroup, and this would be performed separately for each talkgroup. Advantageously, since the mobile devices 12A, 12B, 12C, 12D are using Broadcast and based upon previous information in the mobile devices 12A, 12B, 12C, 12D (e.g. USIM with WAN ID and talkgroup ID), there is no call set up required as is described herein. Also, an access point name (APNID) can reference a network ID to generate uniqueness between group IDs such as on a public carrier.

In FIG. 2, the mobile devices 12A, 12B, 12C, 12D are associated with users who are dispatched to the location 14 with an incident commander, and the mobile devices 12A, 12B, 12C, 12D are LMR and LTE/Wi-Fi capable. LMR wide area voice is available, but the mobile devices 12A, 12B, 12C, 12D lose LTE coverage on scene through the WAN 20 at the location 14. Over the air (OTA) command could also force the mobile devices 12A, 12B, 12C, 12D from LIE into a Wi-Fi mode or it could be automatically detected by a first mobile device, i.e. the mobile device 12A. In that mode, the mobile devices 12A, 12B, 12C, 12D could use the LTE SIM ID and talkgroup ID for identification. With groups of the mobile devices 12A, 12B, 12C, 12D associated with a common private system, the systems and methods can do automatic affiliation to a service set identifier (SSID) without additional engagement. Benefits of this approach then include, once configured, the Broadcast communication can begin immediately with very little time for initial handshaking to calls and late joining can happen due to Broadcast.

For example, assume the mobile device 12A first detects loss of connectivity to the WAN 20 or is directed by the incident commander to set up local Wi-Fi. The mobile device 12A becomes the group owner of the talkgroup associated with the mobile devices 12A, 12B, 12C, 12D. The mobile devices 12B, 12C, 12D fall back to the mobile device 12A as the local AP or are directed to the mobile device 12A via an over-the-air (OTA) direction from the incident commander. The usage of an AP per talkgroup allows for Broadcast and fast call set up. This Broadcast concept does not eliminate the use of 802.11s and MESH propagation of Broadcast calls (up to 4~8 hops depending on jitter requirements).

In an exemplary embodiment, the mobile devices 12A, 12B, 12C, 12D with LMR LTE/Wi-Fi radios could use the Wi-Fi capabilities as an intercom solution while retaining wider area LMR communication via Project 25 (P25). The systems and methods utilize device re-association to an AP (or Group owner when radio based) for fast local talkgroup calls. This re-association event could be driven by signal strength, OTA command, or LMR generated commands that complement the availability of a private LTE system providing a new interconnected manner. This uses the WAN access point 22 credentials such as WAN System ID and Talkgroup ID to develop unique on scene SSID and the automated process to generate a new on scene AP if one does not already exist to enable Broadcast communication. This provides setting up the Broadcast configuration instead of the point to point or multi-cast allowing for fast call operation without any call set up overhead. The use of USIM content can be provided for managing certificates for security, if required. The use of Broadcast allows this concept to be extended for use with 802.11s MESH operation without any call set up.

For example, the mobile devices 12A, 12B, 12C, 12D can set up a local wireless network, such as a WLAN, with an SSID defined based on the WAN access point 22 credentials that identify the specific mobile device, specific individual user, talkgroups or other group associations, associated peers, WAN system references, Access Point Name reference for associated packet data networks, etc. Variously, the WAN access point 22 credentials include some identifying data which associates the mobile devices 12A, 12B, 12C, 12D together in a group, and this can be referred to as a group identifier. In this manner, the SSID is known amongst all of the mobile devices 12A, 12B, 12C, 12D thereby avoiding setup messages and handshaking. The SSID is derived for the WLAN based on the WAN access point 22 credentials, i.e. using the WAN 20 network credentials (the WAN 20 being a first network) to automatically setup the WLAN (which is a second network). In an exemplary embodiment, the SSID can include at least a group identifier associated with the mobile devices 12A, 12B, 12C, 12D with the group identifier being any data or information which associates the mobile devices 12A, 12B, 12C, 12D for communication therebetween in a group. In another exemplary embodiment, the SSID can include at least the group identifier and a WAN identifier. In yet another exemplary embodiment, the SSID can include at least a talkgroup identifier associated with the mobile devices 12A, 12B, 12C, 12D. Those of ordinary skill in the art will recognize that various combinations are contemplated herein including using part or all of credentials that identify the specific mobile device, specific individual user, talkgroups or other group associations, associated peers, WAN system references, Access Point Name reference for associated packet data networks, etc.

Further, the SSID can include other characters that are non-identifying. For example, random numbers in the case where a second WLAN is set up for the same group. Also, the particular format of the SSID is unimportant so long as each mobile device 12A, 12B, 12C, 12D knows ahead of time what to look for. The mobile devices 12A, 12B, 12C, 12D can be configured to look for a portion of the SSID to uniquely identify their association. That is, if the mobile device 12A is taking the role of the WAN access point, the SSID may be GROUP_IDENTIFIER+UNIQUE IDENTIFIER of the mobile device 12A. The other mobile devices 12B, 12C, 12D may only look for the GROUP_IDENTIFIER portion of the SSID while the UNIQUE IDENTIFIER of the mobile device 12A tells them who is the WAN access point. Those of ordinary skill in the art will recognize that the SSID can be formed in a variety of manners with different fields and information. The key is all of the mobile devices 12A, 12B, 12C, 12D know ahead of time what to look for in the SSID to identify a local association in lieu of the WAN 20.

Referring to FIG. 3, in an exemplary embodiment, a block diagram of an exemplary implementation of a mobile device 12 such as the mobile devices 12A, 12B, 12C, 12D. The mobile device 12 can include, without limitation, a smart phone, a radio, a tablet, a laptop, an ultra-book, a net book, or any other portable communication device. The mobile device 12 can be a digital device that, in terms of hardware architecture, generally includes a processor 52, input/output (I/O) interfaces 54, a radio 56, a data store 58, and memory 60. It should be appreciated by those of ordinary skill in the art that FIG. 3 depicts the mobile device 12 in an oversimplified manner, and a practical embodiment can include additional components and suitably configured processing logic to support known or conventional operating features that are not described in detail herein. The components (52, 54, 56, 58, and 60) are communicatively coupled via a local interface 62. The local interface 62 can be, for example but not limited to, one or more buses or other wired or wireless connections, as is known in the art. The local interface 62 can have additional elements, which are omitted for simplicity, such as controllers, buffers (caches), drivers, repeaters, and receivers, among many others, to enable communications. Further, the local interface 62 may include address, control, and/or data connections to enable appropriate communications among the aforementioned components.

The processor 52 is a hardware device for executing software instructions. The processor 52 can be any custom made or commercially available processor, a central processing unit (CPU), an auxiliary processor among several processors associated with the mobile device 12, a semiconductor-based microprocessor (in the form of a microchip or chip set), or generally any device for executing software instructions. When the mobile device 12 is in operation, the processor 52 is configured to execute software stored within the memory 60, to communicate data to and from the memory 60, and to generally control operations of the mobile device 12 pursuant to the software instructions. In an exemplary embodiment, the processor 52 may include a mobile optimized processor such as optimized for power consumption and mobile applications. The I/O interfaces 54 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 54 can also include, for example, a serial port, a parallel port, a small computer system interface (SCSI), an infrared (IR) interface, a radio frequency (RF) interface, a universal serial bus (USB) interface, and the like. The I/O interfaces 54 can include a graphical user interface (GUI) that enables a user to interact with the mobile device 12.

The radio 56 enables wireless communication to an external access device or network. Any number of suitable wireless data communication protocols, techniques, or methodologies can be supported by the radio 56, including, without limitation: RF; LMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; LTE; cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. Importantly, the radio 56 and the mobile device include at least two modes of wireless communication, i.e. communication to the WAN 20 and the mode of local wireless communication both including any of the aforementioned techniques and/or protocols.

The data store 58 can be used to store data. The data store 58 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 58 can incorporate electronic, magnetic, optical, and/or other types of storage media. The memory 60 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 60 may incorporate electronic, magnetic, optical, and/or other types of storage media. Note that the memory 60 can have a distributed architecture, where various components are situated remotely from one another, but can be accessed by the processor 52. The data store 58 and/or the memory 60 can include storage of the preconfigured WAN access point 22 credentials prior to the mobile device 12 arriving at the location 14.

The software in memory 60 can include one or more software programs, each of which includes an ordered listing of executable instructions for implementing logical functions. In the example of FIG. 3, the software in the memory 60 includes a suitable operating system (O/S) 64 and programs 66. The operating system 64 essentially controls the execution of other computer programs, and provides scheduling, input-output control, file and data management, memory management, and communication control and related services. The programs 66 can include various applications, add-ons, etc. configured to provide end user functionality with the mobile device 12. For example, the various systems and methods described herein can be implemented as part of the O/S 64 and/or the programs 66 for causing the mobile device to provide local wireless fallback from WAN connectivity loss. Further, the O/S 64 and/or the programs 66 can cause the mobile device 12 to participate in on-scene communications with other mobile devices 12 such as part of a talkgroup.

In an exemplary embodiment, the O/S 64 and/or the programs 66 can include instructions that, when executed, cause the processor 52 to: perform one of determining that communication with a wide area network (WAN) access point is unsuccessful or receiving an explicit command; and take a role of the WAN access point when the communication is unsuccessful or based on the explicit command; wherein the mobile device uses access point credentials that are based on at least a group identifier used with the WAN access point. The instructions that, when executed, can further cause the processor to: determine if another mobile device has taken the role of the WAN access point prior to taking the role of the WAN access point; and join the another mobile device in lieu of taking the role of the WAN access point if the another mobile device has taken the role of the WAN access point. The instructions that, when executed, can further cause the processor to: subsequent to joining the another mobile device, detect the another mobile device is set for local only or has traffic exceeding a threshold; disassociate from the another mobile device; and take the role of the WAN access point by the mobile device.

The mobile device can take the role of the WAN access point forming a local wireless network, wherein the local wireless network can include a Wireless Local Area Network (WLAN), and wherein a service set identifier (SSID) of the WLAN can derived from the access point credentials such that automatic and quick discovery occurs. The instructions that, when executed, can further cause the processor to: participate in a talkgroup, wherein the access point credentials include at least a talkgroup identifier and a WAN system identifier; broadcast Voice over Internet Protocol (VoIP) over a local wireless network formed by taking the role of the WAN access point; and enforce security via Tunneled Direct Link Setup (TDLS). The instructions that, when executed, further cause the processor to: subsequent to the taking the role of the WAN access point, utilize Tunneled Direct Link Setup (TDLS) to authorize at least one mobile device in a talkgroup; wherein the at least one mobile device is authorized based on certification information stored as part of personalization of the at least one mobile device in a Universal Subscriber Identity Module (USIM). The instructions that, when executed, can further cause the processor to: during the TDLS, perform receive Quality of Service (QoS) from the at least one mobile device.

Figure 4:
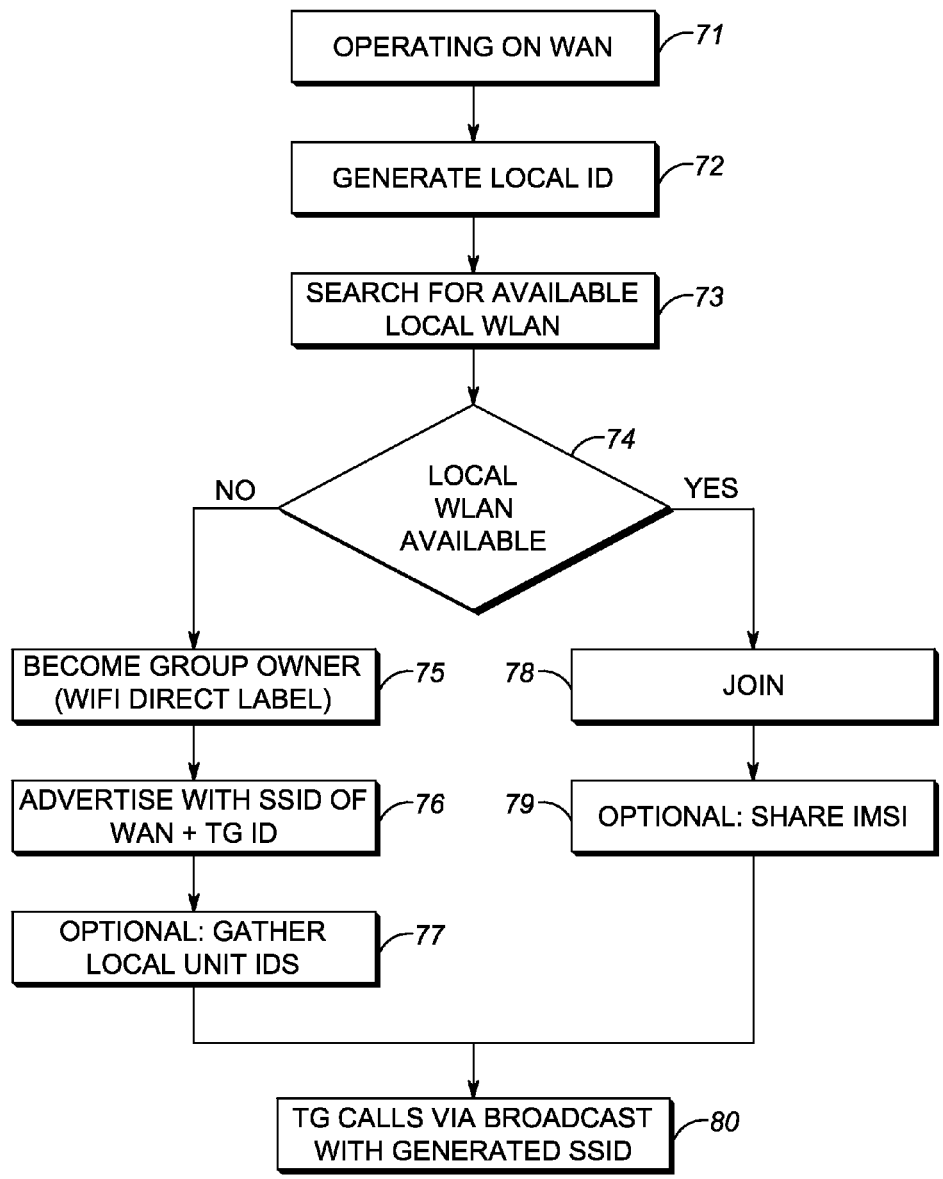
FIG. 4 is a flowchart of a local wireless fallback from WAN method in accordance with some embodiments.

Referring to FIG. 4, in an exemplary embodiment, a flowchart illustrates a local wireless fallback from WAN method 70. The local wireless fallback from WAN method 70 contemplates operation in the mobile device communication system 10 with the mobile devices 12. Specifically, the local wireless fallback from WAN method 70 can be implemented by a single mobile device 12. The local wireless fallback from WAN method 70 initially includes the mobile devices 12 operating on a WAN 20 (step 71). This can be prior to arriving at the location 14 or while at the location 14. The local wireless fallback from WAN method 70 includes generating a local ID (step 72). This can include the WAN access point 22 credentials such as WAN ID, talkgroup ID, etc. At this point, the local wireless fallback from WAN method 70 can determine that local wireless communication is more viable either by losing communication with the WAN or being commanded to local wireless communication. The local wireless fallback from WAN method 70 includes searching for an available WLAN (step 73). The local wireless communication can be any type of local wireless communications with WLAN being an exemplary embodiment.

If a local WLAN is not available (step 74), the local wireless fallback from WAN method 70 includes the mobile device 12 becoming the group owner using a Wi-Fi direct label based on the local ID (step 75). Here, the mobile device 12 is the first one at the location 14 to detect the lack of presence of a WLAN for its specific talkgroup or it is the first device being commanded to set up a WLAN for its specific talkgroup. The local wireless fallback from WAN method 70 includes advertising with an SSID based on the WAN ID and talkgroup ID (step 76). Here, the local wireless fallback from WAN method 70 contemplates using the WAN access point 22 credentials so other mobile devices 12 in the same talkgroup will know exactly what to look for in step 74. Optionally, the local wireless fallback from WAN method 70 can include gathering local unit IDs by the mobile device 12 (step 77).

If the local WAN is available (step 78), the local wireless fallback from WAN method 70 includes the mobile device 12 joining the local WAN (step 78). Here, the mobile device 12 is at the location 14 and another mobile device 12 has already set up the local WAN for the talkgroup. Optionally, the local wireless fallback from WAN method 70 can include the mobile device 12 sharing its International Mobile Subscriber Identity (IMSI) (step 79). Subsequent to steps 77, 79, the local wireless fallback from WAN method 70 includes the mobile device 12 talking in the talkgroup (TG) via broadcast with the generated SSID (step 80). All information used to generate IDs can be stored in USIM by current LTE European Telecommunications Standards Institute (ETSI) definition and the corporation personalization aspect of USIM can be used to store additional information, Quality of Service (QoS) or prioritization requirements.

Figure 5:
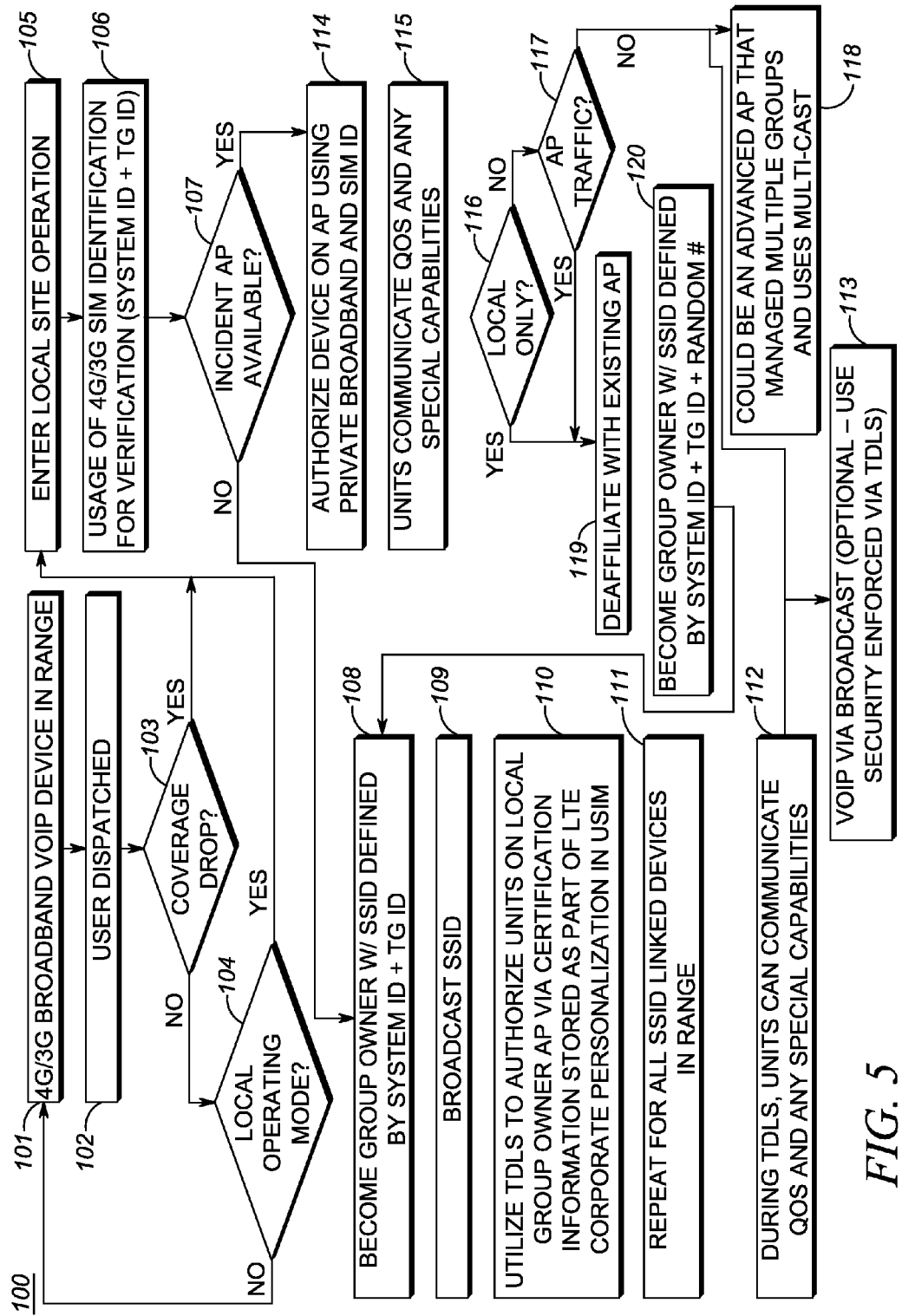
FIG. 5 is a flowchart of a WAN to WLAN fallback method in accordance with some embodiments.

Referring to FIG. 5, in an exemplary embodiment, a flowchart illustrates a WAN to WLAN fallback method 100. The WAN to WLAN fallback method 100 is similar to the local wireless fallback from WAN method 70 providing additional description thereof. The WAN to WLAN fallback method 100 contemplates operation in the mobile device communication system 10 with the mobile devices 12. Specifically, the WAN to WLAN fallback method 100 can be implemented by a single mobile device 12. The WAN to WLAN fallback method 100 includes the mobile device 12, being a 4G/3G broadband VoIP device, being in range of the WAN (step 101). A user associated with the 4G/3G broadband VoIP device is dispatched to a scene, e.g. the location 14 (step 102). The WAN to WLAN fallback method 100 checks if the WAN coverage drops below a threshold (step 103). If the coverage does not drop below the threshold (step 103), the WAN to WLAN fallback method 100 checks if there is an OTA command to enter a local operating mode (step 104). Thus, the WAN to WLAN fallback method 100 can switch to local based on either loss or bad coverage in step 103 or manual switch in step 104. If there is not an OTA command to enter the local operating mode (step 104), the 4G/3G broadband VoIP device continues on the WAN (step 101).

If there is a command to enter the local operating mode (step 104) or if the coverage drops below the threshold (step 103), the WAN to WLAN fallback method 100 enters local site operation (step 105). The WAN to WLAN fallback method 100 includes the 4G/30 broadband VoIP device using its SIM identification for verification (i.e. System ID and talkgroup ID) (step 106). This includes the WAN access point 22 credentials. The WAN to WLAN fallback method 100 checks if an incident AP is available for local operation (step 107). The incident AP will have an SSID derived from at least the talkgroup ID along with possibly other known parameters based on the WAN access point 22 credentials by the mobile device 12. If there is not an incident AP available (step 107), the mobile device 12 becomes the group owner, i.e. the incident AP, with the SSID defined by a system ID and talkgroup ID (step 108). Here, the mobile device 12 takes the role of the WAN access point 22 using a local wireless technology.

The WAN to WLAN fallback method 100 includes the incident AP broadcasting its SSID at the location (step 109). The WAN to WLAN fallback method 100 can utilize TDLS to authorize units on the local group owner AP via certification information stored as part of the LTE corporate personalization in USIM (step 110). This includes the WAN access point 22 credentials being input prior to the WAN to WLAN fallback method 100 and arrival at the location 14. The WAN to WLAN fallback method 100 can repeat steps 109, 110 for all SSID linked devices in range (step 111). The WAN to WLAN fallback method 100 includes, during TDLS, having the mobile devices communicate QoS and any special capabilities (step 112). The WAN to WLAN fallback method 100 includes VoIP via broadcast and optional security enforced via TDLS (step 113).

If there is an incident AP available (step 107), the WAN to WLAN fallback method 100 authorizes the mobile device 12 on the incident AP using private broadband and SIM ID (step 114). The WAN to WLAN fallback method 100 includes the mobile device communicating QoS and any special capabilities to the incident AP (step 115). The WAN to WLAN fallback method 100 checks if the incident AP is pushed for local only (step 116). If the incident AP is not pushed for local only (step 116), the WAN to WLAN fallback method 100 checks is the incident AP's traffic exceeds a threshold (step 117). If the incident AP's traffic does not exceed the threshold (step 117), the WAN to WLAN fallback method 100 includes VoIP via broadcast and optional security enforced via TDLS (step 113). Alternatively, the incident AP could be an advanced AP that manages multiple groups using multi-cast (step 118).

If the incident AP is pushed for local only (step 116) or if the incident AP's traffic does exceed the threshold (step 117), the WAN to WLAN fallback method 100 has the mobile device 12 disaffiliate with the incident AP (step 119). The WAN to WLAN fallback method 100 includes the mobile device 12 becoming with group owner with the SSID defined by the system ID and talkgroup ID along with a random number to delineate from the overused or local only incident AP (step 120). Subsequent, the WAN to WLAN fallback method 100 includes VoIP via broadcast and optional security enforced via TDLS (step 113).

The mobile device communication system 10, the local wireless fallback from WAN method 70, and the WAN to WLAN fallback method 100 are designed to complement the LMR and Broadband operation for on-scene/conventional operation. The LMR world benefits greatly from a non-infrastructure peer to n-peer style of communication. The systems and methods described herein generate similar operation via the automatic fallback or message generated response, such that in field users can more reliably have on-scene communication in poor or non-coverage Broadband areas.

The systems and methods can use various WLAN interworking parameters used in the 3GPP standard such as in ETSI TS 124 234 V11.3.0 (2012-11) "Universal Mobile Telecommunications System (UMTS); LTE; 3GPP system to Wireless Local Area Network (WLAN) interworking; WLAN User Equipment (WLAN UE) to network protocols; Stage 3," ("TS 124 234") the contents of which are incorporated by reference herein. In Section 7.1 of TS 124 234, parameters are specified for WLAN interworking. The format of the pseudonym is specified in 3GPP TS 33.234 [5]. The "deleted" value to indicate no valid pseudonym exists in the USIM/ME is specified in 3GPP TS 23.003 [1A]. The "User Controlled PLMN Selector for WLAN access" file contains a list of PLMN codes preferred by the user. The "Operator Controlled PLMN Selector for WLAN access" file contains a list of PLMN codes preferred by the operator. The "User Controlled WLAN Specific Identifier list" file contains a list of WSIDs related to I-WLAN preferred by the user. The "Operator Controlled WLAN Specific Identifier list" file contains a list of WSIDs related to I-WLAN preferred by the operator. The "Supported PLMNs list for WLAN access" file contains a list of PLMN codes of roaming partners (i.e. to which the WLAN operator has a direct roaming relationship). The systems and methods described herein contemplate using the aforementioned standards to communicate between the WAN and WLAN.

The International mobile subscriber identity (IMSI) uses SIM cards are identified on their individual operator networks by a unique International Mobile Subscriber Identity (IMSI). Mobile network operators connect mobile phone calls and communicate with their market SIM cards using their IMSIs. The format is: the first three digits represent the Mobile Country Code (MCC); the next two or three digits represent the Mobile Network Code (MNC), three-digit MNC codes are allowed by E.212 but are mainly used in the United States and Canada; and the next digits represent the Mobile Subscriber Identification Number (MSIN). Normally there will be 10 digits but would be fewer in the case of a 3-digit MNC or if national regulations indicate that the total length of the IMSI should be less than 15 digits. It is possible to create a group with multiple devices, this requires a one-to-many connection, one Group Owner (GO) and many clients. The GO acts as a Dynamic Host Configuration Protocol (DHCP) server and provide an IP address to the connected clients (which should act as a DHCP client). Each device can easily know its own IP and the GO's IP, so it should be possible to do a broadcast using the address 255.255.255.255.

Support for Wi-Fi Direct lets users connect directly to nearby peer devices over Wi-Fi without impacting the Wi-Fi Access Point. No internet connection or tethering is needed. Through the systems and methods, users can connect to compatible devices to take advantage of new features such as instant sharing of files, photos, or other media; streaming video or audio from another device; or connecting to compatible printers or other devices. This is not ad-hoc mode—it is "Wi-Fi direct", which is a Wi-Fi Alliance specification unrelated to IEEE 802.11. This is an extension to the ubiquitous infrastructure mode of operation that can operate without a dedicated access point. Ad Hoc, or IBSS, mode is a legacy protocol for Wi-Fi devices, and Wi-Fi Direct is a new innovation. With the technology underlying Wi-Fi Direct, a device can maintain a simultaneous connection to an infrastructure network—this is not possible with Ad Hoc. The Access Point continues to broadcast the timing beacons. The specification underlying the Wi-Fi Direct certification program was developed within the Wi-Fi Alliance by member companies. It operates on 802.11 devices but is not linked to any specific IEEE 802.11 amendment.

Figure 6:
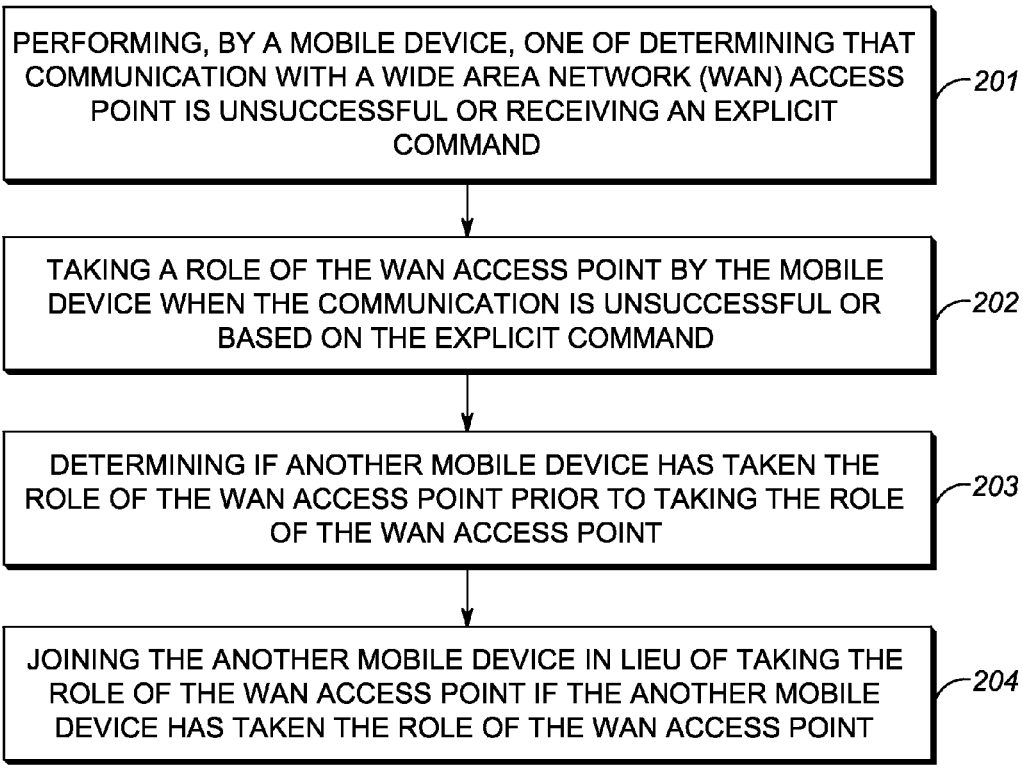
FIG. 6 is a flowchart of a method for local wireless network fallback from a WAN in accordance with some embodiments.

Referring to FIG. 6, in an exemplary embodiment, a flowchart illustrates a method 200 for local wireless network fallback from a WAN. The method 200 contemplates operation in the mobile device communication system 10 with the mobile devices 12. Specifically, the method 200 can be implemented by a single mobile device 12. The method 200 includes performing, by a mobile device, one of determining that communication with a wide area network (WAN) access point is unsuccessful or receiving an explicit command (step 201). Optionally, the mobile device can be participating in a talkgroup with a talkgroup identifier (ID). The communication to the WAN access point can be unsuccessful due to loss of coverage, poor coverage, etc., and the explicit command can be an over-the-air command to cease communication on the WAN access point, such as by an incident commander.

The method 200 includes taking a role of the WAN access point by the mobile device when the communication is unsuccessful or based on the explicit command (step 202). Here, the mobile device is effectively becoming the WAN access point using a local wireless technology as described herein. The mobile device uses access point credentials that are based on at least a group identifier used with the WAN access point. In this manner, all mobile devices that are in communication at a scene will know what to look for the local wireless technology without requiring setup and handshaking therebetween.

Optionally, the method 200 can include determining if another mobile device has taken the role of the WAN access point prior to taking the role of the WAN access point (step 203). Here, the mobile device can decide not to become the WAN access point if another mobile device with the same preconfigured WAN access point 22 credentials has already taken the role. Optionally, the method 200 can joining the another mobile device in lieu of taking the role of the WAN access point if the another mobile device has taken the role of the WAN access point (step 204).

Optionally, the method 200 can further include, subsequent to the joining the another mobile device, detecting the another mobile device is set for local only or has traffic exceeding a threshold; disassociating from the another mobile device; and taking the role of the WAN access point by the mobile device. The mobile device takes the role of the WAN access point forming a local wireless network. This can include any local wireless network technology described herein. Importantly, the mobile device forms the local wireless network with the WAN access point 22 credentials, i.e. using WAN credentials to form a WLAN. The local wireless network can include a Wireless Local Area Network (WLAN), and a service set identifier (SSID) of the WLAN can be derived from the access point credentials such that automatic and quick discovery occurs.

A service set identifier (SSID) of the mobile device can be derived from one or more of a talkgroup identifier, a WAN system identifier, and a combination thereof in a predefined known manner thereby avoiding setup messages. Optionally, the method 200 can include participating in a talkgroup, wherein the access point credentials include at least a talkgroup identifier and a WAN system identifier. Optionally, the method 200 can further include broadcasting Voice over Internet Protocol (VoIP) over a local wireless network formed by the mobile device; and enforcing security via Tunneled Direct Link Setup (TDLS).

Optionally, the method 200 can further include, subsequent to the taking the role of the WAN access point, utilizing Tunneled Direct Link Setup (TDLS) to authorize at least one mobile device in a talkgroup. The at least one mobile device can be authorized based on certification information stored as part of personalization of the at least one mobile device in a Universal Subscriber Identity Module (USIM). Optionally, the method 200 can further include, during the TDLS, receive Quality of Service (QoS) from the at least one mobile device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises" . . . a "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method, comprising:
performing, by a mobile device, one of determining that communication with a wide area network (WAN) access point is unsuccessful or receiving an explicit command; and
taking a role of the WAN access point by the mobile device when the communication is unsuccessful or based on the explicit command; wherein the mobile device takes the role of the WAN access point forming a local wireless network;

using, by the mobile device and as an identifier of the mobile device to another mobile device when acting as an access point for the another mobile device, access point credentials that are based on at least a group identifier used with the WAN access point; wherein the local wireless network comprises a Wireless Local Area Network (WLAN), and wherein a service set identifier (SSID) of the WLAN is derived from the access point credentials such that automatic and quick discovery occurs.

2. The method of claim 1, further comprising:
determining if a different mobile device has taken the role of the WAN access point prior to taking the role of the WAN access point; and
joining the different mobile device in lieu of taking the role of the WAN access point if the different mobile device has taken the role of the WAN access point.

3. The method of claim 2, further comprising:
subsequent to the joining the different mobile device, detecting the different mobile device is set for local only or has traffic exceeding a threshold;
disassociating from the different mobile device; and
taking the role of the WAN access point by the mobile device.

4. The method of claim 1, further comprising:
participating in a talkgroup, wherein the access point credentials comprise at least a talkgroup identifier and a WAN system identifier.

5. The method of claim 4, further comprising:
broadcasting Voice over Internet Protocol (VoIP) over a local wireless network formed by the mobile device; and
enforcing security via Tunneled Direct Link Setup (TDLS).

6. The method of claim 1, wherein the explicit command comprises an over-the-air command instructing use of a local wireless network in lieu of the WAN.

7. The method of claim 1, further comprising:
subsequent to the taking the role of the WAN access point, utilizing Tunneled Direct Link Setup (TDLS) to authorize at least one mobile device in a talkgroup.

8. The method of claim 7, wherein the at least one mobile device is authorized based on certification information stored as part of personalization of the at least one mobile device in a Universal Subscriber Identity Module (USIM).

9. The method of claim 7, further comprising:
during the TDLS, receive Quality of Service (QoS) from the at least one mobile device.

10. A mobile device, comprising:
a wireless network interface configured to communicate in a wide area network (WAN) and in a local area network;
a processor communicatively coupled to the wireless network interface; and
memory storing instructions that, when executed, cause the processor to:
perform one of determining that communication with a wide area network (WAN) access point is unsuccessful or receiving an explicit command; and
take a role of the WAN access point when the communication is unsuccessful or based on the explicit command; wherein the mobile device takes the role of the WAN access point forming a local wireless network;
use, as an identifier of the mobile device to another mobile device when acting as an access point for the another mobile device, access point credentials that are based on at least a group identifier used with the WAN access point; wherein the local wireless network comprises a Wireless Local Area Network (WLAN), and wherein a service set identifier (SSID) of the WLAN is derived from the access point credentials such that automatic and quick discovery occurs.

11. The mobile device of claim 10, wherein the instructions that, when executed, further cause the processor to:
determine if a different mobile device has taken the role of the WAN access point prior to taking the role of the WAN access point; and
join the different mobile device in lieu of taking the role of the WAN access point if the different mobile device has taken the role of the WAN access point.

12. The mobile device of claim 11, wherein the instructions that, when executed, further cause the processor to:
subsequent to joining the different mobile device, detect the different mobile device is set for local only or has traffic exceeding a threshold;
disassociate from the different mobile device; and
take the role of the WAN access point by the mobile device.

13. The mobile device of claim 10, wherein the instructions that, when executed, further cause the processor to:
participate in a talkgroup, wherein the access point credentials comprise at least a talkgroup identifier and a WAN system identifier;
broadcast Voice over Internet Protocol (VoIP) over a local wireless network formed by taking the role of the WAN access point; and
enforce security via Tunneled Direct Link Setup (TDLS).

14. The mobile device of claim 10, wherein the instructions that, when executed, further cause the processor to:
subsequent to the taking the role of the WAN access point, utilize Tunneled Direct Link Setup (TDLS) to authorize at least one mobile device in a talkgroup;
wherein the at least one mobile device is authorized based on certification information stored as part of personalization of the at least one mobile device in a Universal Subscriber Identity Module (USIM).

15. The mobile device of claim 14, wherein the instructions that, when executed, further cause the processor to:
during the TDLS, perform receive Quality of Service (QoS) from the at least one mobile device.

16. A wireless system, comprising:
a plurality of mobile devices configured to communicate in a wide area network and in a local area network at a location, wherein the plurality of mobile devices are associated to one another via one or more identifiers prior to arrival at the location;
memory in each of the plurality of mobile devices storing instructions that, when executed, cause each of the plurality of mobile devices to:
perform one of determining that communication with a wide area network (WAN) access point is unsuccessful or receiving an explicit command; and
take a role of the WAN access point when the communication is unsuccessful or based on the explicit command; wherein one of the plurality of mobile devices takes the role of the WAN access point forming a local wireless network;
use as an identifier of said one of the mobile devices to another mobile device of the plurality of mobile devices when acting as an access point for the another mobile device, access point credentials that are based on at least a group identifier used with the WAN access point; wherein the local wireless network comprises a Wireless Local Area Network (WLAN), and wherein a service set identifier (SSID) of the WLAN is derived from the access point credentials such that automatic and quick discovery occurs.

* * * * *

UNITED STATES PATENT AND TRADEMARK OFFICE
CERTIFICATE OF CORRECTION

PATENT NO.       : 9,144,103 B2
APPLICATION NO.  : 13/873649
DATED            : September 22, 2015
INVENTOR(S)      : David E. Klein It is certified that error appears in the above-identified patent and that said Letters Patent is hereby corrected as shown below:

IN THE SPECIFICATION:

In Column 5, Line 25, delete "(APNID)" and insert -- (APN) --, therefor.

In Column 8, Line 24, delete "(O/S)" and insert -- (OS) --, therefor.

In Column 8, Line 33, delete "O/S" and insert -- OS --, therefor.

In Column 8, Line 35, delete "O/S" and insert -- OS --, therefor.

In Column 8, Line 39, delete "O/S" and insert -- OS --, therefor.

In Column 10, Line 31, delete "4G/30" and insert -- 4G/3G --, therefor.

In Column 13, Line 61, delete ""comprises"...a" and insert -- "comprises...a," --, therefor.

Signed and Sealed this
Twelfth Day of July, 2016

Michelle K. Lee
*Director of the United States Patent and Trademark Office*